United States Patent [19]

Hirata et al.

[11] 4,072,409
[45] Feb. 7, 1978

[54] RELEASE DEVICE OF MOTION PICTURE CAMERA

[75] Inventors: Noritsugu Hirata, Yokohama; Tomoshi Takigawa, Machida; Kazuo Ishikawa, Yokohama, all of Japan

[73] Assignee: Canon Kabushiki Kaisha, Tokyo, Japan

[21] Appl. No.: 685,190

[22] Filed: May 11, 1976

[30] Foreign Application Priority Data

May 19, 1975 Japan .................................. 50-59439

[51] Int. Cl.² .............................................. G03B 1/00
[52] U.S. Cl. .................................... 352/174; 352/169; 352/177
[58] Field of Search ............... 352/174, 176, 177, 169, 352/137, 121

[56] References Cited

U.S. PATENT DOCUMENTS

| | | | |
|---|---|---|---|
| 3,178,721 | 4/1965 | Kamp | 352/169 |
| 3,512,881 | 5/1970 | Kubota | 352/169 |
| 3,520,598 | 7/1970 | Murata | 352/169 |

*Primary Examiner*—Monroe H. Hayes
*Attorney, Agent, or Firm*—Toren, McGeady and Stanger

[57] ABSTRACT

A motion picture camera with a release device capable of selective control of rotative movement of the shutter blade in the camera for a normal motion picture sequence and for a single frame slot depending upon the position of a selector therefor. The release device is provided with the single stop lever arranged between the shutter blade and a release member to be pivoted in either of two planes, perpendicular to each other. For a motion picture sequence, as the pivotal movement of the stop lever is limited to only one of the planes, it is retained in operative engagement with the release member so long as the latter is pressed, thus permitting a number of revolutions of the shutter blade in sequence. When the selector is manually switched to the single frame position, a disengage actuator is brought into cooperation with both of the shutter blade and the stop lever in such a manner that just after an exposure aperture is covered by the shutter blade to terminate a single frame exposure, the disengage actuator causes a pivotal movement of the stop lever in the other plane which in turn causes the stop lever to be taken out of the operative engagement with the release member as the stop lever is pivoted in the first-named plane regardless of the fact that release member is pressed. This results in operative engagement of the stop lever with the shutter blade to stop the shutter blade in the exposure aperture closed position.

17 Claims, 6 Drawing Figures

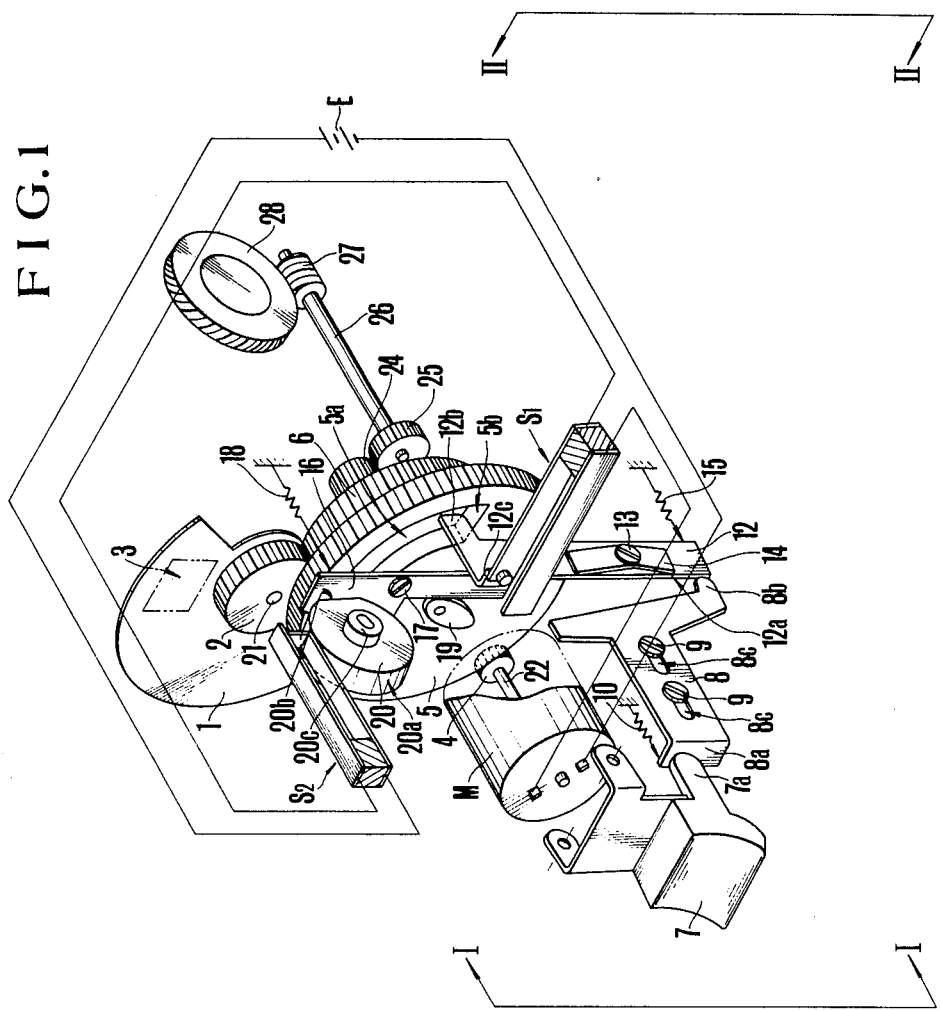

RELEASE DEVICE OF MOTION PICTURE CAMERA

BACKGROUND OF THE INVENTION

1. Field of the Invention

This invention relates to motion picture cameras, and more particularly to a motion picture camera with a release device capable of selective control of movement of the shutter for either a normal picture sequence or a single frame shot.

2. Description of the Prior Art

As known in the art, motion picture cameras are normally provided with a control button or trigger which will cause the camera to operate so long as it is pressed. However, it is frequently desired to expose a single frame, rather than a series of frames. Due to the relatively high speed of normal operation, it is virtually impossible to press and release the trigger quickly enough to insure that only one frame will be exposed.

This has led to a modification of the release mechanism with the provision of additional components of particular structure by means of which a single frame shot can be made with ease even by an amateur using a motion picture camera with a release mechanism as such. Further, there has been proposed a wide variety of methods of selective control between a normal motion picture sequence and a single frame shot, as for example, disclosed in U.S. Pat. No. 3,512,881.

This patent provides a release device including first and second stop levers and first and second release buttons. The first stop lever is arranged between the first release button and a notch formed in a portion of a disk member rotatable with the shutter blades as a unit. So long as the first release button is pressed, the stop lever is retained in the disengaged position relative to the notch to perform a normal motion picture sequence, while permitting the second stop lever to remain in an idle position relative to the disk member. For a single frame shot, the second release button may be pressed after the pressing force has been removed from first release button, thereby the first stop lever is taken out of engagement with the disk member and at the same time the second stop lever is brought into cooperation with the disk member so that near the completion of the revolution of the shutter blade the second stop lever engages the disk member at the notch to ensure that only one frame is exposed.

Such a release device is, however, complicated in structure, because of its double system for releasing the camera, that is, with the first release mechanism adapted only for a normal motion picture type of operation and with the second release mechanism only for a single frame shot, and this complexity makes the device body itself so heavy and bulky that it is very difficult to incorporate it in the limited space available within the housing of a small size motion picture camera of compact structure. Further, such a release mechanism arrangement does not permit sufficiently high accurate and reliable movements of the individual stop levers relative to each other and to the disk member, and is liable to lead to possible damage to the device. Furthermore, another disadvantage is that, because of the provision of two release buttons which are operated independently of each other, namely, the first release button for the motion picture type of operation and the second release button for the single frame shot, the depression of the wrong release button from that to which the photographer intended to depress may take place with resultant incorrect operation, such that though the photographer intends to photograph a motion picture sequence, a single frame shot will result, or vice versa.

Besides the aforesaid type of release device, there is also known another type of release device including a single stop lever arranged so that near the completion of one revolution of a shutter blade the stop lever engages the shutter blade to ensure that only one frame will be exposed despite the fact that a single release button remains depressed, thus omitting the second stop lever and the second release button, as disclosed in U.S. Pat. No. 3,178,721.

This patent is concerned with a control mechanism for a motion picture camera with a shutter blade carrying a fixed pin. A single stop lever is provided upon engagement with the pin to stop the shutter blade in the exposure aperture closed position. This stop lever is movable in only one plane as it is releasably latched to a pivotal member a by latching member provided thereon which pivotal member is arranged to be movable in only one plane perpendicular to the plane of rotation of the shutter blade in response to the actuation of a single release button. The stop lever and pivotal member operate as a unit so long as a selector is set in the first operating position for a normal motion picture type of operation, where the cam surface of the latching member is positioned out of the path of movement of the pin, when the release button is depressed. Once the force is released from the release button, the pin engages the cam surface at a time near the completion of one revolution of the shutter blade to cause unlatching of the stop lever which in turn causes movement of the stop lever into the path of rotation of the pin under the action of its own resilience. For a single frame shot, the selector may be set from the first operating position to the second operating position where pivotal movement of the pivotal member is limited to a smaller extent than that when set to the first operating position, in more detail, to such an extent as that sufficient to release the pin from engagement with the stop lever but insufficient to move the cam surface of the latching member entirely clear of the path of rotation of the pin. With this arrangement, therefore, when the release button is depressed, the pivotal member together with the stop lever still latched thereto move as a unit to a position where the acting edge of the stop lever alone is displaced out of the path of rotation of the shutter pin to start the camera. When the shutter blade comes to a point just before the completion of one revolution, the pin engages the cam surface of the latching member and moves the latching member out of latching engagement with the stop lever. Under the action of its own resilience, the stop lever pivotally returns to the engaged position with the aforesaid pin, and hence the shutter blade is stopped at the time one revolution of the shutter blade has been completed in order to insure that only one frame is exposed.

As is understandable from the above, the release device constituting part of the control mechanism of U.S. Pat. No. 3,178,721 has a higher possibility of reducing the dimensions of the device body itself than that of U.S. Pat. No. 3,512,881, namely owing to the omission of the second release button and second stop lever which function as essential components in the latter device, thereby giving an additional advantage of avoiding incorrect operation of the camera which may be encountered when the exposure mode is changed between a normal motion picture sequence and a single frame shot.

On the other hand, however, many difficulties have been introduced to the construction of a control mechanism as such. For example, in order to impart the function of performing a single frame shot into the control mechanism, the shutter control means has to be divided into two members movable relative to each other, namely, the pivotal member and the stop lever, and arranged to necessitate a latching member by means of which the two members are coated as a unit when the camera is set in the position for the normal motion picture sequence. This latching member must be so dimensioned that when the camera is set to the position for a single frame shot the aforesaid latching be released just before the completion of one revolution of the shutter blade to permit effective operation of the stop lever alone, independently of other components. Thus the complete release device is a very complicated structure. In addition, these and other moving parts must be manufactured to close tolerances, or otherwise the selective control of the shutter between positions for a normal motion picture type of operation and for a single frame shot would be made impossible. For example, the amount of movement of the pivotal member must be accurately adjusted by means of a selector lever so that when in the normal motion picture position, the acting end of the stop lever and the cam surface of the latching member are movable for a sufficient distance from the path of rotation of the shutter pin, while when in the single frame position the acting end of the stop lever only is moved away from the path of rotation of the shutter pin, but the cam surface of the latching member is retained in the path. In view of such close tolerances, complicated construction and the necessity of fine adjustment of the relative positions of various components, the reliability and repeatability of the camera is greatly impaired. Further, in assembling a complete release device as incorporated in the camera body, from these components it is practically very difficult to effect sufficiently fine adjustment of these components in position in order for the camera to operate satisfactorily.

As the control mechanism of U.S. Pat. No. 3,178,721 operates in a very elaborate manner, and therefore results in a relatively complicated construction for controlling operation of the shutter, much is left to be desired. In producing economically a good release device for a motion picture camera of the type capable of selective control of the shutter for a normal motion picture type of operation and for a single frame shot, there remain many problems yet to be solved. Such problems become serious when the camera is of small and compact type.

SUMMARY OF THE INVENTION

With the foregoing considerations in mind, it is a primary object of the present invention to obviate all the above mentioned drawbacks of conventional release devices which enables a camera associated therewith to operate for a single frame shot as well as for a motion picture sequence and to provide a release device of the character described of which various basic components are simplified in construction and arrangement so that these components may be assembled to produce economically a complete release device which when incorporated in a camera ensures a higher reliability and repeatability of the camera in selective control for a motion picture sequence and for a single frame shot than was previously possible.

Another object of the present invention is to provide an improved release device which enables a camera to operate for a single frame shot by a very simplified mechanism so that the adjustment of the various moving parts is greatly facilitated even when these parts are assembled in the camera body, without causing reduction in the accuracy of movement of these moving parts during exposure operations which could otherwise result, and which release device is particularly adapted for use in a small size compact motion picture camera.

Still another object of the present invention, concomitant with the foregoing objects, is to provide a release device having a single release button by means of which a camera associated therewith can be released for operation regardless of whether the operation is for a motion picture sequence or for a single frame shot, thereby minimizing the possibility of a different exposure mode from that which the photographer intended to make due to the erroneous selection of release buttons which are otherwise necessary as in the prior art.

To accomplish these objects, in accordance with a principle of the present invention, a release device for a motion picture camera having a rotating shutter blade includes a stop lever arranged upon engagement with shutter driving means to stop the shutter blade in an exposure aperture closed position and a release member arranged upon actuation to disengage the stop lever from the driving means to initiate rotative movement of the shutter blade, that is, to initiate either a motion picture sequence or a single frame shot. The release device is provided with a selector member manually operable from the outside of the camera and having at least two switchable positions, namely, RUN position and SINGLE FRAME position. When the selector member is set in SINGLE FRAME position, a control member or disengage actuator is rendered effective so that at a time near the completion of one revolution of the shutter blade, the stop lever is taken out of operative engagement with the release member by the disengage actuator and then brought into operative engagement with the shutter driving means to ensure that only one frame will be exposed despite of the fact that the release button remains actuated.

A further object of the present invention is to provide a release device of the character described in association with an electric motor for driving the shutter blade so that when set in the single frame shot position the electric motor is energized no longer than the time interval necessary for the shutter blade to achieve one revolution thereby saving the premature consumption of the energy of a power source battery which would otherwise result.

To accomplish this object, in accordance with a preferred embodiment of the invention, a switch member connected to the electric motor for driving the shutter for rotation is arranged to be controllable by the stop lever in such a manner that the motor is deenergized so long as the shutter blade is stopped by the stop lever in the exposure aperture closed position.

In the preferred embodiment of the invention, a power supply control switch connected between the aforesaid driving motor and the power source battery of the camera is arranged adjacent the above mentioned selector member to be closed only when the selector member is set in either of the positions for a motion picture sequence and for a single frame shot.

Other objects, features and advantages of the present invention will become apparent from the following detailed description of the particularly preferred embodiments of the invention taken in conjunction with the accompanying drawings in which:

BRIEF DESCRIPTION OF THE DRAWINGS

FIG. 1 is a perspective view, partly schematic, of the basic parts of one embodiment of a release device according to the present invention as associated with a driving mechanism of a motion picture camera;

DETAILED DESCRIPTION OF THE PREFERRED EMBODIMENTS

Figure 2B:
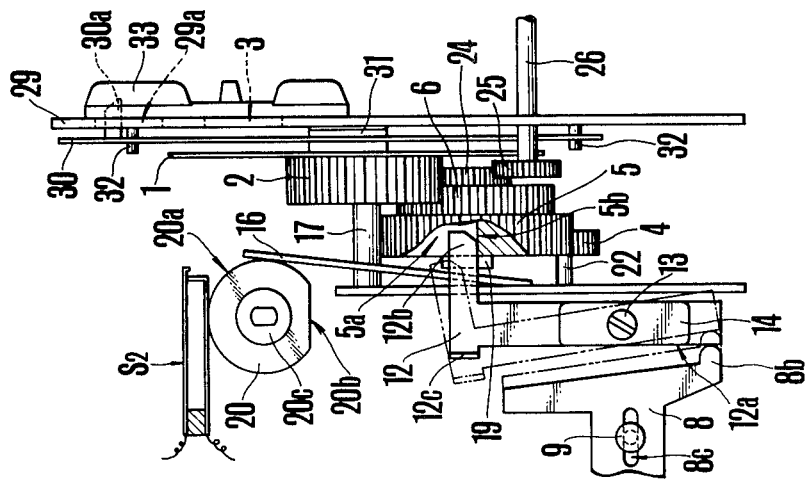
FIG. 2(b) is a side elevational view of the device of FIG. 1 as viewed from the direction indicated by arrows II in FIG. 1 in two operative positions indicated by solid lines for the actuated release member and by dot-and-dash lines for the deactuated release member, with the selector member being shown as set in the motion picture sequence position.

Referring to FIGS. 1, 2 and 3, there is shown one embodiment of a release device according to the present invention as applied to a motion picture camera having a shutter blade 1 fixedly mounted on a shutter gear 2 and rotatable about a common shaft 21 in front of an exposure aperture 3. A driving mechanism is shown as including an electric motor M, a pinion 4 mounted on the output shaft 22 of motor M, an idle gear 5 meshing with pinion 4, and an intermediate gear 6 fixedly mounted on the idle gear 5 and meshing with the shutter gear 2, the parts 4, 5 and 6 constituting a motion-transmitting arrangement through which the motion of motor M is transmitted to the shutter gear 2 to drive the shutter blade for rotation. Fixedly mounted on a common shaft 23 of gears 5 and 6 is a small gear 24 meshing with a small gear 25 of which the rotative movement is transmitted through a rotary shaft 26 and a worm gear 27 to a worm wheel 28, these parts constituting part of a film transporting mechanism.

Figure 2A:
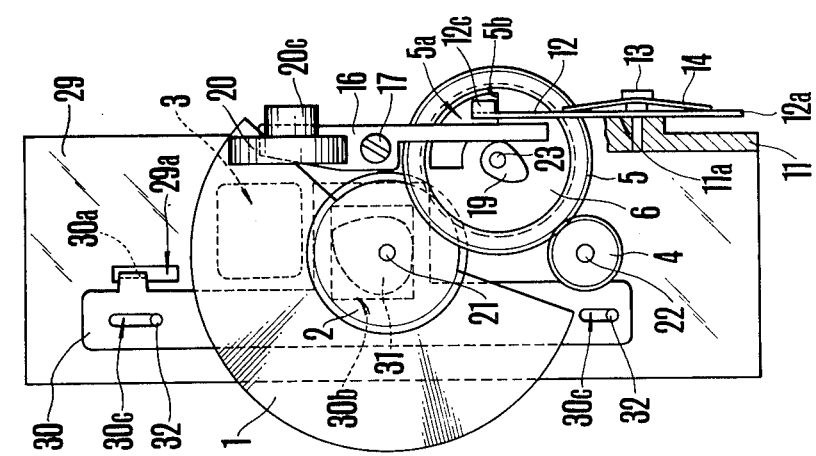
FIG. 2(a) is a front elevational view of the device of FIG. 1 with additional parts of film advancing means, as viewed from the direction indicated by arrows I in FIG. 1, said device being set in the motion picture sequence position.
Figure 3B:
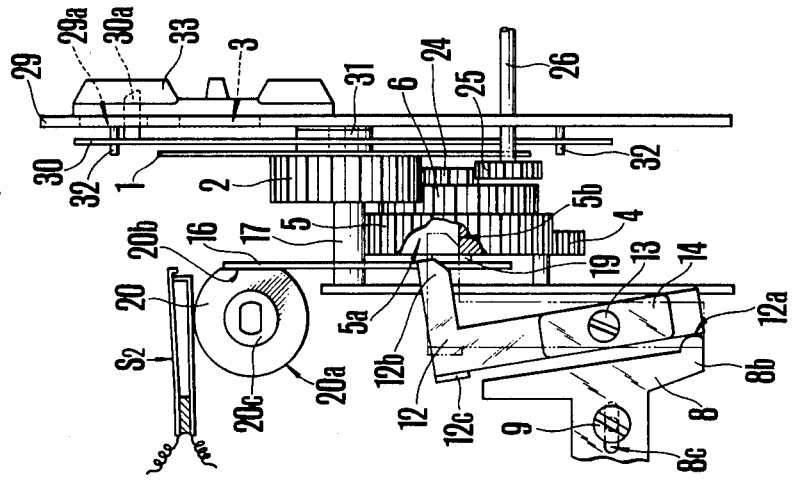
FIG. 3(b) is a side elevational view similar to FIG. 2(b) but different therefrom in that the device is set in the single frame position.
Figure 3A:
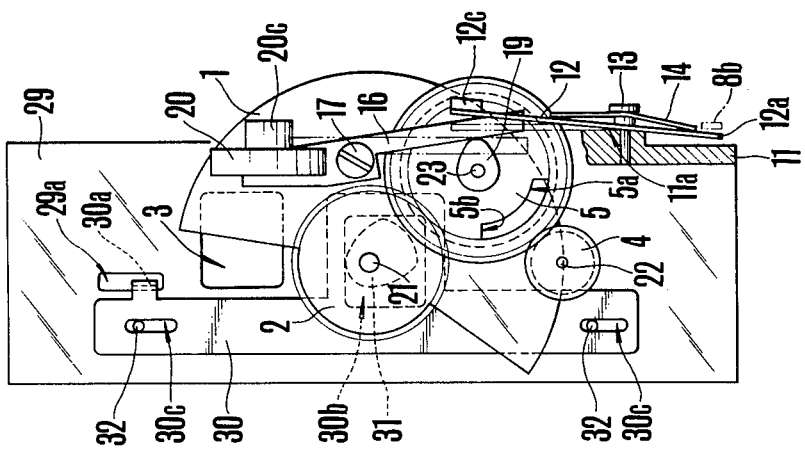
FIG. 3(a) is a front elevational view similar to FIG. 2(a) but different therefrom in that the device is set in the single frame position with the shutter blade being in position near the completion of one revolution.

The release device of the invention includes a release button or trigger 7 accommodated in a recessed portion of a camera housing at the front panel thereof and having a rearwardly extending projection 7a, and a release slide having two longitudinally elongated slots 8c in which are engaged respective pins 9 extending from the wall 11a of a side plate 11 constituting part of a frame work structure inside the camera body (see FIGS. 2a and 3a). The release slide 8 is biased toward the front by an expansion spring 10 which urges the slide 8 for normal abutment at its rectangularly bent front portion 8a with the projection 7a of trigger 7.

The release device further includes a stop lever 12 pivotable in either of two planes about a common pivot pin 13 fixedly mounted on the wall 11a of the side plate 11, one plane of which is coincident with that in which slide 8 moves, and another plane which is nearly or exactly perpendicular to the first-named plane. So long as the stop lever 12 is retained in the first-named plane, operative engagement of the lower end portion 12a of stop lever 12 with a rearwardly extending lug 8b of slide 8 is effected under the action of an expansion spring 15 so that upon depression of trigger 7 stop lever 12 is turned counter-clockwise about pin 13 as viewed in FIG. 1 to an extent large enough to disengage a projection 12b rearwardly extending from the upper end portion of stop lever 12 from an arcuate cutout 5a formed in idle gear 5 and concentric to the shaft 23. In the second-named plane, stop lever 12 is pivotable from the intersection line of the first and second planes against the force of a plate spring 14 to a small extent such that stop lever 12 can be taken out of the operative engagement with the release slide 8 by a disengage actuator 16 to be described in detail later. The plate spring 14 serves to permit pivotal movement of stop lever 12 in the first plane when trigger 7 is either depressed, or released, provided that no effective force is applied to stop lever 12 from the disengage actuator 16. Expansion spring 15 urges stop lever 12 for clockwise movement, in other words, for movement into stopping engagement at its projection 12b with idle gear 5. The extension of cutout 5a formed in a portion of idle gear 5 is limited at 5b so that when stop lever projection 12b is brought into contact with the end surface 5b of cutout 5a, the shutter blade 1 is positioned to cover the entire area of exposure aperture 3.

Positioned adjacent stop lever 12 is a first switch S1, namely, motor control switch, connected in a circuit between motor M and a power source battery E. When stop lever 12 is turned counter-clockwise to a disengaged position where the projection 12b is disengaged from cutout 5a, first switch S1 is closed in engagement at its movable contact with a rectangularly bent portion 12c of stop lever 12. With this arrangement, when trigger 7 is depressed, slide 8 is moved to the right, as viewed in FIG. 1, while engaging trigger projection 7a. Such rearward movement of slide 8 causes counter-clockwise movement of stop lever 12 about pivot pin 13 in engagement at its lower end portion 12a with slide lug 8b, resulting in disengagement of stop lever 12 from idle gear 5 and at the same time in the closure of switch S1 to start the camera.

The disengage actuator or disengaging member 16 is constructed in a form of a lever pivotable in either of two planes about a common pivot pin 17, and arranged to cooperate with a cam member 19 fixedly mounted on idle gear 5 at such a location that the cam axis coincides with the axis of shaft 23 when a selector member 20 is set in SINGLE FRAME position, as shown in FIGS. 1 and 3, where, just before the completion of one revolution of shutter blade 1, the disengage actuator 16 is brought into instantaneous coaction with stop lever 12 once during each revolution of shutter blade 1, as actuator 16 is pivoted by cam 19 about pin 17 in a plane almost parallel to the second plane of stop lever 12, thereby stop lever 12 is pivoted in the second plane to a disengaged position from release slide 8. In other words, the responsive relation of stop lever 12 to trigger 7 is broken off at a point between slide lug 8b and lever end 12a. Upon setting selector 20 from SINGLE FRAME position to RUN position, actuator lever 16 is pivoted about pin 17 in a plane almost perpendicular to the first-named plane, namely, to the longitudinal plane containing the axis of pin 17 to such an extent that camming engagement between actuator 16 and cam 19 is broken off to cause the camera to operate so long as trigger 7 is depressed.

The selector 20 is constructed as comprising a cam disk of which the periphery 20a has a flat recess 20b and against which the actuator lever 16 is normally abutted under the action of spring 18, and a linkage 20c by means of which a control knob not shown is rigidly connected to selector 20 thereby it being made possible to manually operate selector 20 from the outside of the camera. When the flat recess 20b receives the upper end portion of disengage actuator lever 16, camming engagement between actuator lever 16 and cam 19 is established. When the selector 20 is turned to move the flat recess 20b away from actuator lever 16, as shown in FIG. 2, actuator lever 16 is disengaged from cam 19.

A second switch S2 is provided to effect much less chance of running down the battery E unnecessarily. The second switch or main switch S2 is connected in a circuit between motor M and battery E and is arranged adjacent selector 20 to be closed when selector 20 is set in either of RUN and SINGLE FRAME positions and to be open when selector 20 is set in SAFE position where the flat recess 20b receives the tip of movable contact of switch S2.

As shown in FIGS. 2 and 3, the film transporting mechanism includes a customary pull-down slide 30 positioned between shutter blade 1 and an aperture plate 29 and whose claw 30a enters the perforations of a film not shown contained in a film cartridge through a slit 29a provided in aperture plate 29a. As shutter blade 1 together with shutter gear 2 rotates, a cam 31 mounted on shutter gear 2 and operatively engaging in a cam follower portion 30b formed in a portion of pull-down slide 30 causes pull-down slide to reciprocate through guide slot 30c-and-pin 32 connections at a frequency equal to that of film frames, thereby the film is intermittently advanced past the exposure aperture 3 formed in aperture plate 29 downwardly, as viewed in the figures, always by the length of a frame while being guided by film guide members 33 fixed mounted on aperture plate 29.

The operation of the release device of FIGS. 1, 2 and 3 is next be described in connection with (A) motion picture sequence and with (B) single frame shot.

A. Motion picture sequence:

For a motion picture sequence, the photographer may manipulate the control knob not shown to set selector 20 from SAFE position to RUN position where the circular periphery 20a causes actuator lever 16 to be disengaged from cam 19 and simultaneously causes second switch S2 to be closed, thereby the stop lever 12 is rendered unresponsive to the movement of shutter blade 1.

When trigger 7 is depressed, the release slide 8 is moved to the right against the force of spring 10 and then stop lever 12 is turned counter-clockwise about pivot pin 13 in the first plane by release slide 8 until the idle gear 5 is freed from stop lever projection 12b as shown by dot-and-dash lines in FIG. 2(b). Such counter-clockwise movement of stop lever 12 also causes closure of first switch S1, resulting in energization of motor M from power source battery E as second switch S2 was previously closed. The motion of motor M is transmitted through the pinion 4, idle gear 5 and intermediate gear 6 to the shutter gear 2 to drive the shutter blade 1 for rotation as well as to drive the film transporting mechanism. When the exposure aperture 3 is fully uncovered by the shutter blade 1, the pull-down claw 30a holds a frame stationary behind the exposure aperture 3 for about $\frac{1}{2}$ cycle of claw operation. Then claw 30a reaches back to pull the next frame forward. The film intermittently transported past the exposure aperture 3 is taken upon a reel driven by the worm wheel 28 connected through gears 24 and 25, rotary shaft 26 and worm gear 27 to the intermediate gear 6 meshing with shutter gear 2. Such procedure continues so long as trigger 7 is depressed.

When trigger 7 is released, the release slide 8 is moved to the left under the action of spring 10 and finally comes to rest in the position indicated by the solid line in FIG. 2(b), so that the stop lever 12 is made ready for operative engagement with idle gear 5. At a time near the completion of final one revolution of shutter blade 1, the stop lever projection 12b enters the cutout 5a of idle gear 5 and is then brought into contact with the end surface 5b of cutout 5a to stop the idle gear 5 from further rotation. On the other hand, the entrance of stop lever projection 12b into the cutout 5a causes the first switch S1 to open with deenergization of motor M.

B. Single frame shot:

For a single frame exposure, the control knob is turned to allow the flat recess 20b of selector 20 to receive disengage actuator lever 16 while nevertheless maintaining the second switch S2 in the closed position by the circular periphery 20a, as shown in FIG. 3(b). In this arrangement, the disengage actuator lever 16 follows the camming surface of the cam member 19 so that the lower end portion of actuator lever 16 strikes the upper end portion of stop lever 12 once during each revolution of the shutter blade 1 to take the stop lever 12 out of operative engagement at its lower end with the release slide lug 8b.

With this arrangement, when trigger 7 is depressed, the stop lever 12 is disengaged from the idle gear 5 in a manner similar to that shown above, and the motor M is energized through the closed first switch S1. When movement of the shutter blade 1 has reached a predetermined phase, a corresponding lift amount of cam member 19 is at maximum with a maximum amount of counter-clockwise movement of actuator lever 16 about pin 17 at which time the stop lever 12 is pivoted about pin 13 in the second plane against the force of the plate spring 14 to break off the engaging relation to release slide 8, in other words, the responsive relation of the stop lever 12 to the trigger 7. Thereby the stop lever 12 is made pivotable about pin 13 in a plane slightly inclined from the first plane so that when the cutout 5a of idle gear 5 comes to a position opposite to the stop lever projection 12b, the stop lever 12 is further turned clockwise under the action of spring 15 until the projection 12b enters the cutout 5a. As the idle gear 5 is further turned, the cutout end surface 5b is brought into contact with the projection 12b to stop the idle gear 5. At the same time, the motor control switch S1 is opened to deenergize the motor M. In such a way, it is sure that only one frame is exposed despite of the fact that the trigger 7 is held depressed.

When the trigger 7 is released from the force necessary to depress it, the release slide 8 returns to its initial position under the action of spring 10 to permit slight pivotal movement of the stop lever 12 in the second plane under the action of spring 14 to its initial position where the stop lever 12 is in the same plane as that of the release slide 8.

Another embodiment of the present invention applied to a camera of which the releasing is effected electromagnetically will be next explained with reference to FIG. 4. The same numerals are employed in that figure to denote parts of that embodiment of the invention which remain substantially unchanged from the embodiment illustrated in FIGS. 1, 2 and 3. As the difference between these two embodiments is limited to the incorporation of an electro-magnet and necessary modifications therefor, the following description is simplified for the purpose of clarity as giving considerations only to different components from those of the release device of FIGS. 1, 2 and 3.

Figure 4:
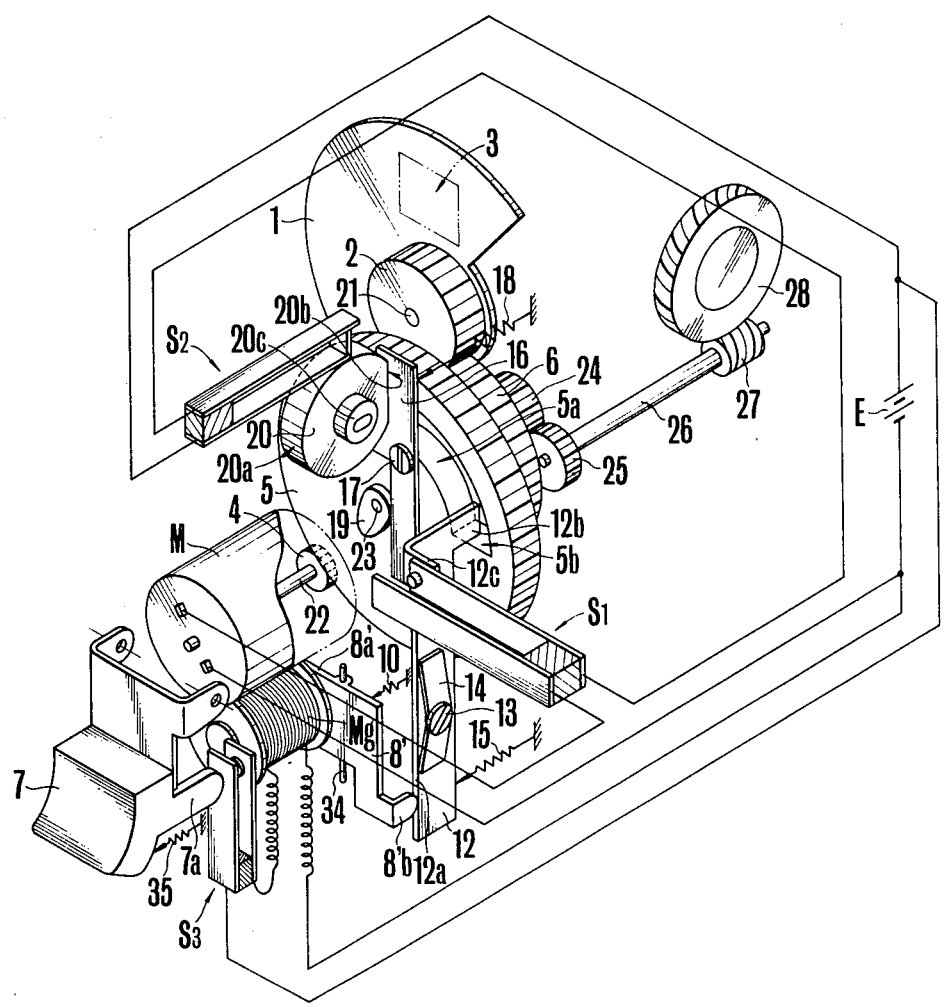
FIG. 4 is a perspective view, partly schematic, of the basic parts of another embodiment of a release device according to the invention as applied to an electro-magnetically releasable motion picture camera.

In FIG. 4, a release lever 8' is provided instead of the release slide 8 but it is arranged to perform the same function as that of slide 8. The release lever 8' is pivotally mounted on a shaft 34 and has a projection 8'b extending into the path of pivotal movement of the stop lever 12. When the release lever 8' is turned counter-clockwise as viewed in FIG. 4 against the force of the spring 10 by an energized electro-magnet Mg positioned adjacent one end portion 8'a of the release lever 8', the stop lever 12 is turned counter-clockwise about pin 13 in the first plane against the force of the spring 15 to effect its disengagement from the idle gear 5, while operatively engaged at its projection 8'b with the end portion 12a of the downward arm of stop lever 12. There is further provided a normally open switch S3 for controlling operation of the electro-magnet Mg connected in a circuit between a solenoid of the electro-magnet Mg and the battery E and arranged upon depression of the trigger 7 to be closed by its projection 7a. When a force exerted on the trigger 7 is removed, the trigger 7 is returned to the initial position under the action of spring 35.

In the operation of the release device of FIG. 4, when the trigger 7 is depressed against the force of spring 35 with the selector 20 set in RUN position, the third switch S3 is closed by the trigger projection 7a to energize the solenoid of electro-magnet Mg which results in attraction of the release lever end 8'a. As the release lever 8' turns counter-clockwise against the force of spring 10 about the shaft 34, the release lever projection 8'b is brought into operative engagement with the stop lever end 12a and then causes the stop lever 12 to turn counter-clockwise about the pin 13 in the first plane against the force of spring 15 until the idle gear 5 is released from the latched position against the stop lever projection 12b. Such movement of the stop lever 12 causes closure of the first switch S1 to start the motor M, thereby a motion picture sequence is initiated in the same manner as that described in connection with FIGS. 1, 2 and 3.

When the trigger 7 is released from the force exerted thereon, the trigger 7 is turned by spring 35 to open the third switch S3 to deenergize the solenoid of electro-magnet Mg. Thereby the release lever 8' is turned by spring 10 to leave the stop lever 12 behind under the action of the spring 15. Therefore, when the cutout 5a comes to a position opposite to the stop lever projection 12b, the latter enters the cutout 5a under the action of spring 15 to stop the idle gear 5 with the resulting closure of the first switch S1.

For a single frame exposure, the selector 20 is set to SINGLE FRAME position, and then the trigger 7 is depressed to energize the solenoid of electro-magnet Mg to release the shutter blade 1 and also be energize motor M. When rotative movement of the shutter blade 1 has reached a predetermined phase, the disengage actuator lever 16 acts on the stop lever 12 to turn the stop lever 12 about pin 13 in the second plane containing the axis pin 13 against the force of plate spring 14, thereby the operative engagement of the stop lever 12 with the release lever 8' is broken off. When the shutter blade 1 has reached a predetermined position where the exposure aperture 3 is fully covered, the stop lever 12 is actuated by spring 15 to stop the shutter blade 1, thereby the single frame shot is terminated despite the fact that the trigger 7 is held depressed. It is to be noted that at the time the stop lever 12 stops the idle gear 5, the disengage actuator lever 16 is, because of the minimum lift amount of the cam member 19, retracted from the active position to the stop lever 12, and therefore the stop lever 12 is turned in the second plane to the position where the the stop lever 12 is in the same plane as that of the release lever projection 8'b, thus being engageable again therewith.

When the trigger 7 is released from the force exerted thereon, the switch S3 is turned off to deenergize the solenoid of electro-magnet Mg, causing the release lever 8' to return to its initial position under the action of spring 10.

As has been explained in detail, the present invention provides a release device of very simplified construction essentially containing only two members, namely, a stop lever responsive to the actuation and deactuation of the release button for controlling the opening and closing operation of the shutter blade respectively, and a disengage actuator lever arranged upon setting a mode selector in a single frame exposure position to break off the responsive relation of the stop lever to the release button once during each revolution of the shutter blade. It is, therefore, practically possible to produce economically a complete release device for a motion picture camera of the type selectively capable of a normal motion picture type of operation and a single frame shot, and further to facilitate incorporation of such release device in a small size compact motion picture camera without undue modification of the camera mechanism while nevertheless preserving a higher reliablitity and repeatability of the camera than when employing a conventional release device.

Further by arranging the release switch to cooperate with the stop lever, it can be avoidable, should an incorrect setting be made, to leave the electrical apparatus of the camera unnecessarily connected to the power source battery so that the battery may be run down after a relatively short period of useful operation, mainly because the electric motor for driving the camera is cut off from the power supply circuit each time an exposure or a series of exposures is terminated. This is very advantageous particularly when a single frame shot is made, as it is liable to result in wasteful consumption of the energy of the camera power source.

What is claimed is:
1. A motion picture camera comprising:
 (a) an exposure aperture,
 (b) rotatable shutter means arranged for selectively uncovering and covering said exposure aperture by the rotational movement,
 (c) stop means arranged normally for latching said shutter means at a position in which the shutter means fully covers the exposure aperture, said stop means being movable in either of at least a first and a second predetermined plane of substantially different orientation and releasing the latching of the shutter means of the movement in said first plane, (d) release means manually operable from the outside of said camera and arranged upon acutation for displacing said stop means in said first plane from its latching position to its unlatching position against said shutter means, said release means being operatively engageable with the stop means, so long as the stop means is retained in said first plane, and (e) disengaging means responsive to the rotational operation of said shutter means for displacing said stop means in at least said second plane to break off the operative engagement with said release means and thereafter for causing said stop means to return to its latching position against said shutter means once during each revolution of the shutter means, thereby only one single frame shot being made possible despite the fact that said release means remains held in the actuated position.

2. A motion picture camera according to claim 1, further comprising;

cam means operatively engageable with said disengaging means for displacing said stop means in said second plane, said cam means being connected with said shutter means for bringing said disengaging means into actuating engagement with said stop means once during each revolution of said shutter means as said shutter means rotates.

3. A motion picture camera according to claim 2, further comprising;

selecting means manually operable from the outside of said camera and operatively coupled with said disengaging means for selectively setting said disengaging means to an active position for operative engagement with said cam means and an idle position for disengagement from said cam means.

4. A motion picture camera according to claim 3, further comprising:

(a) driving means for driving said shutter means in rotation, said driving means being operatively connected to said shutter means, and (b) switch means electrically connected to said driving means for controlling actuation of said driving means and arranged adjacent said selecting means so that its switching control is dependent upon the position of said selecting means, wherein said selecting means is provided with means formed in a portion thereof and adapted to effect such dependence.

5. A motion picture camera according to claim 1, further comprising;

(a) driving means operatively connected to said shutter means for driving said shutter means for rotation, and (b) switch means electrically connected to said driving means for controlling actuation of said driving means and arranged adjacent said stop means to be closed when said stop means is displaced in said first plane away from said shutter means.

6. A motion picture camera according to claim 5, wherein said release means comprises;

(a) a release button manually operable from the outside of said camera, and (b) a release lever operatively coupled with said release button to move in response to actuation of said release button and operatively engageable with said stop means to displace said stop means in said first plane.

7. A motion picture camera comprising;

(a) an exposure aperture, (b) rotatable shutter means arranged for selectively uncovering and covering said exposure aperture by the rotational operation, (c) stop means arranged normally for latching said shutter means at a position in which the shutter means fully covers said exposure aperture, said stop means being movable in either of at least a first and a second predetermined plane of substantially different orientation and releasing the latching of the shutter means by the movement in said first plane, (d) release means arranged upon actuation for displacing said stop means in said first plane from its latching position to its unlatching position against said shutter means, said release means being operatively engageable with the stop means, so long as said stop means is retained in said first plane, (e) electro-magnet means controlling actuation of said release means, (f) switch means electrically connected to said electro-magnet means for controlling energization and deenergization of said electro-magnet means, (g) control means manually operable from the outside of said camera for switching control of said switch means, and (h) disengaging means responsive to the rotational operation of said shutter means for displacing said stop means in at least said second plane to break off the operative engagement with said release means and thereafter for causing said stop means to return to its latching position against said shutter means once during revolution of the shutter means, whereby only one single frame shot being made possible despite the fact that said release means remains held in the actuated position.

8. A motion picture camera according to claim 7, further comprising;

cam means operatively engageable with said disengaging means for displacing said stop means in said second plane, said cam means being connected with said shutter means to bring said disengaging means into actuating engagement with said stop means once during each revolution of said shutter means as said shutter means rotates.

9. A motion picture camera according to claim 8, further comprising;

selecting means manually operable from the outside of said camera and operatively coupled with said disengaging means to be capable of selectively setting said disengaging means to an active position for operative engagement with said cam means and an idle position for disengagement from said cam means.

10. A motion picture camera according to claim 9, further comprising;

(a) driving means for driving said shutter means for rotation, said driving means being operatively connected to said shutter means, and (b) switch means electrically connected to said driving means for controlling actuation of said driving means and arranged adjacent said selecting means so that its switching control is dependent upon the position of said selecting means, wherein said selecting means is provided with means formed in a portion thereof and adapted to effect such dependence.

11. A motion picture camera according to claim 7, further comprising;
   (a) driving means operatively connected to said shutter means for driving said shutter means for rotation, and
   (b) switch means electrically connected to said driving means for controlling actuation of said driving means and arranged adjacent said stop means to be closed when said stop means is displaced in said first plane away from said shutter means.

12. A motion picture camera comprising;
   (a) an exposure aperture,
   (b) rotatable shutter means arranged for selectively uncovering and covering said exposure departure by the rotational operation and for stopping at a position where said exposure aperture is fully covered,
   (c) release means arranged upon actuation thereof to be displaced in a predetermined direction to effect a camera release,
   (d) stop means for arresting said shutter means at said position, and stop means being arranged at least upon camera release to be operatively engaged with said release means and displaced in a predetermined direction from an arresting position against said shutter means, thereby said shutter means being rendered rotative to uncover said exposure aperture, and
   (e) disengaging means responsive to the rotational operation of said shutter means so as to be brought into actuating engagement with at least one of said release means and said stop means for displacing at least one of said release means and said stop relative to the other in a direction substantially different from the corresponding aforesaid predetermined direction to break off the operative engagement between said release means and said stop means and thereafter for causing said stop means to arrest said shutter means at said position once during each revolution of the shutter means,
thereby only one single frame shot being made possible despite the fact that said release means remains held in the actuated position.

13. A motion picture camera according to claim 12, further comprising;
   cam means operatively engageable with said disengaging means and rotatable in linkage with said shutter means to bring said disengaging means into actuating engagement with at least one of said release means and said stop means within the one revolution of said shutter means to break off the operative engagement between said release means and said stop means.

14. A motion picture camera according to claim 13, further comprising;
   selecting means manually operable from the outside of said camera and arranged for operative coupling with said disengaging means to be capable of selectively setting said disengaging means to an active position for operative engagement with said cam means and an idle position for disengagement from said cam means.

15. A motion picture camera according to claim 14, further comprising;
   (a) driving means for driving said shutter means for rotation said driving means being operatively connected to said shutter means, and
   (b) switch means electrically connected to said driving means for controlling actuation of said driving means and arranged adjacent said selecting means so that its switching control is dependent upon the position of said selecting means, wherein said selecting means is provided with means formed in a portion thereof and adapted to effect such dependence.

16. A motion picture camera according to claim 12, further comprising;
   (a) driving means for driving said shutter means for rotation, said driving means being operatively connected to said shutter means, and
   (b) switch means electrically connected to said driving means for controlling actuation of said driving means and arranged adjacent said stop means so that its switching control is dependent upon the position of said stop means.

17. A motion picture camera according to claim 12, further comprising;
   (a) electro-magnet means controlling actuation of said release means for camera release,
   (b) switch means electrically connected to said electro-magnet means for controlling energization and deenergization of said electro-magnet means, and
   (c) control means manually operable from the outside of said camera for switching control of said switch means.

* * * * *